(12) United States Patent
Yadav et al.

(10) Patent No.: US 12,459,645 B2
(45) Date of Patent: Nov. 4, 2025

(54) TOGGLE LOCK RESTRAINT FOR AIRCRAFT CARGO HANDLING SYSTEMS

(71) Applicant: Goodrich Corporation, Charlotte, NC (US)

(72) Inventors: Sanjay Yadav, Bangalore (IN); Mohinder Saini, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 702 days.

(21) Appl. No.: 17/846,968

(22) Filed: Jun. 22, 2022

(65) Prior Publication Data

US 2023/0150671 A1   May 18, 2023

(30) Foreign Application Priority Data

Nov. 18, 2021 (IN) .............................. 202141053044

(51) Int. Cl.
| | | |
|---|---|---|
| *B64D 9/00* | (2006.01) | |
| *B60P 7/08* | (2006.01) | |
| *B60P 7/13* | (2006.01) | |

(52) U.S. Cl.
CPC ................ *B64D 9/003* (2013.01); *B60P 7/08* (2013.01); *B60P 7/13* (2013.01)

(58) Field of Classification Search
CPC ............... B64D 9/003; B60P 7/08; B60P 7/13
See application file for complete search history.

(56) References Cited

U.S. PATENT DOCUMENTS

| | | | |
|---|---|---|---|
| 3,774,551 A | 11/1973 | Sweger | |
| 3,778,012 A * | 12/1973 | Fernandez | ............ B60P 7/0815 |
| | | | 193/40 |
| 4,077,590 A * | 3/1978 | Shorey | ................... B64D 9/003 |
| | | | 414/532 |
| 4,089,275 A * | 5/1978 | Pelletier | ................. B64D 9/003 |
| | | | 410/79 |
| 4,379,668 A | 4/1983 | Pelletier | |
| 4,415,298 A | 11/1983 | Voigt | |
| 2004/0265085 A1 * | 12/2004 | Mayer | ................... B64D 9/003 |
| | | | 410/77 |

FOREIGN PATENT DOCUMENTS

DE    19611765 C1 * 10/1997 ................ B60P 7/13

* cited by examiner

*Primary Examiner* — Daniel J Colilla
(74) *Attorney, Agent, or Firm* — SNELL & WILMER L.L.P.

(57) ABSTRACT

A cargo restraint that accommodates restraining ULDs having a distorted or elevated retention base is disclosed (e.g., a retention base that is spaced above a conveyor plane, for instance coinciding with a cargo deck). An outer pawl includes at least one pivot that is maintained in a fixed location on the outer pawl, and that is movable along a slot to change the elevation of the pivot (and the elevation of a restraining head of the outer pawl when in an erected position). Movement of the pivot along the slot first allows the restraining head of the outer pawl to be positioned above a retention base of a ULD, including when the retention base is at an elevated position. Further movement of the pivot along the slot allows the restraining head of the outer pawl to engage and move the retention base of the ULD toward/to the conveyor plane.

18 Claims, 14 Drawing Sheets

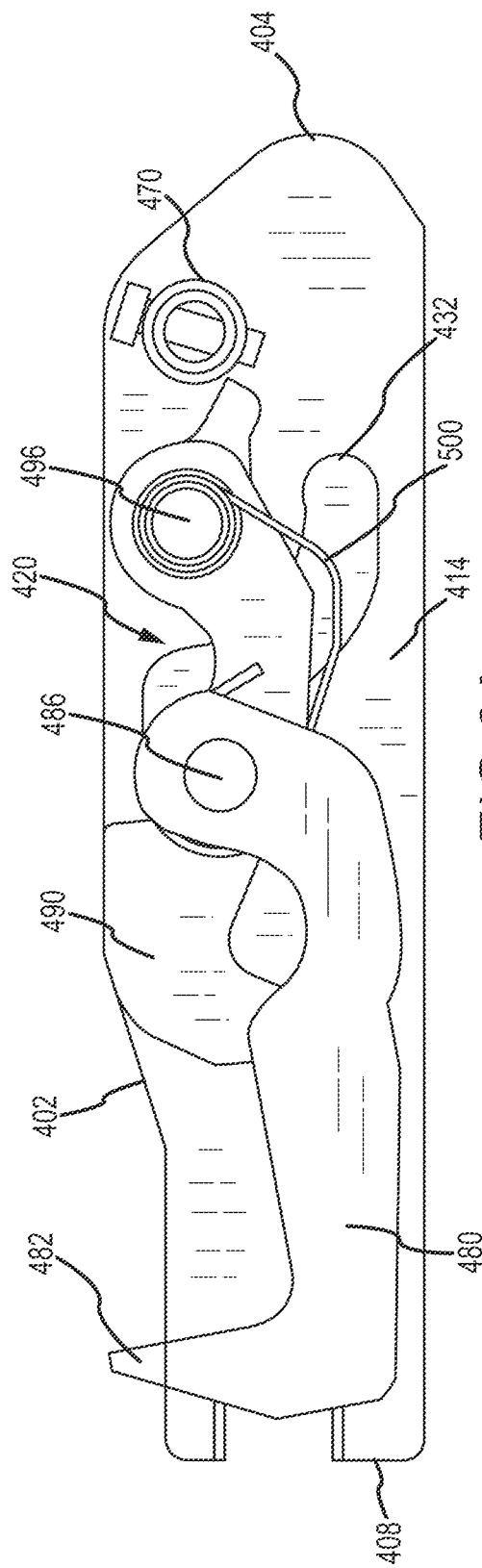
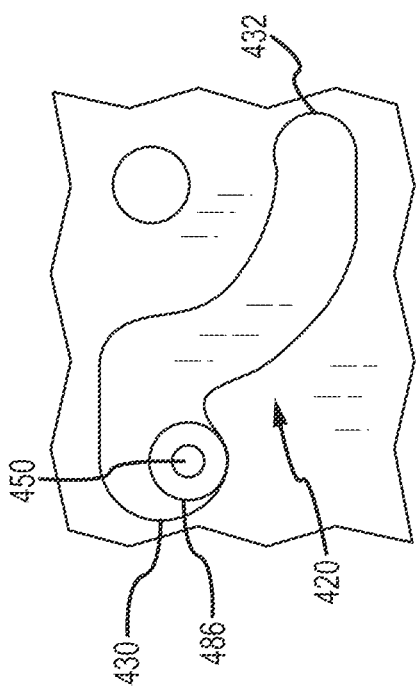
FIG.6A
FIG.6B

TOGGLE LOCK RESTRAINT FOR AIRCRAFT CARGO HANDLING SYSTEMS

CROSS-REFERENCE TO RELATED APPLICATIONS

This application claims priority to, and the benefit of, India Patent Application No. 202141053044, filed Nov. 18, 2021 (DAS Code B3C2) and titled "TOGGLE LOCK RESTRAINT FOR AIRCRAFT CARGO HANDLING SYSTEMS," which is incorporated by reference herein in its entirety for all purposes.

FIELD

The present disclosure generally relates to the field of securing cargo and, more particularly, to engaging cargo that has a distorted edge or base.

BACKGROUND

Latches or cargo restraints are part of cargo handling systems and are used to restrain Unit Load Devices (ULDs), pallets, and the like in aircraft cargo compartments. ULDs may become warped or bent over time because of overuse. This may prevent cargo restraints from being able to engage an end or base of a ULD edge to secure the same in at least one of the vertical or z dimension. In such cases, the ULD may need to be bent down with large manual force to the pawl level of the cargo restraint and the pawl may then need to be forcefully urged in order to properly engage with the ULD. Cargo compartment operators may need to strike the cargo restraint many times to make it engage with a warped ULD base, which increases cargo loading time and thus, a longer turnaround time for the next flight. At least 2 people may be required in order to engage a cargo restraint with one side of a ULD, which also increases labor costs.

SUMMARY

A cargo restraint is presented herein. Both the configuration of such a cargo restraint and the operational characteristics/operation of such a cargo restraint are within the scope of this Summary.

A cargo restraint includes at least one sidewall having a slot. A first location of the slot is disposed at a first elevation, while a second location of the slot is disposed at a second elevation that is less than the first elevation. The first location and the second location are spaced along a length of the slot, as well as along a longitudinal dimension of the cargo restraint. The cargo restraint further includes a first pivot that is disposed at a fixed location on the first pawl. The first pivot is positioned within and movable along the length of the slot and including in the longitudinal dimension of the restraint. Movement of the first pivot along the length of the slot may be used to change the elevation of a restraining head of the first pawl, for instance to position the restraining head to engage a retention rim of a ULD that is spaced above a conveyor plane (e.g., by moving the first pivot from a home location to the first location, which may increase the elevation of the restraining head), to dispose the restraining head in engagement with such a retention rim to move the same at least in the direction of the conveyor plane (e.g., by moving the first pivot from the first location to the second location, which may decrease the elevation of the restraining head), or both.

According to various embodiments of the present disclosure, a cargo restraint is provided. The cargo restraint includes a first wall including a first slot, a first pawl, and a first pivot. A first location of the first slot is disposed at a first elevation. A second location of the first slot is disposed at a second elevation that is less than the first elevation. The first location and the second location are spaced along a length of the slot and along a longitudinal dimension of the cargo restraint. The first pivot is disposed at a fixed location on the first pawl and is movable along the length of the first slot. The first pawl is pivotable relative to the first wall about the first pivot.

In various embodiments, the first slot includes a first slot end and a slot second end. In various embodiments, the first slot includes a first lower sidewall and a first upper sidewall that are spaced in a width dimension of the first slot and that each extend along the length of the first slot from the first slot end to the slot second end. In various embodiments, an elevation of the first lower sidewall increases proceeding along the length of the first slot from the first slot end to the first location.

In various embodiments, the elevation of the first lower sidewall decreases proceeding along the length of the first slot from the first location in a direction of the second location.

In various embodiments, the slot second end includes the second location and is semicircular. In various embodiments, the first upper sidewall initially extends downwardly proceeding from the slot second end and then at least generally upwardly to define a stopper that projects into an interior of the first slot.

In various embodiments, the cargo restraint further includes a second pawl and a first spring. In various embodiments, the second pawl is pivotally connected to the first wall at a second fixed location. In various embodiments, the first spring interconnects between the first pawl and the second pawl so that advancing the first pivot along the length of the first slot proceeding from the first location in a direction of the second location changes the second pawl from a first position to a second position that is more erect than the first position.

In various embodiments, the second fixed location is located between the first location and the second location in the longitudinal dimension of the cargo restraint.

In various embodiments, the first pawl is pivotable relative to the first wall about a single axis. In various embodiments, a position of the single axis is variable along the length of the first slot.

Also, according to various embodiments of the present disclosure, a cargo system including a first structure and the cargo restraint is provided. The first structure includes a first surface and the first pawl includes a restraining head engageable with the first surface.

In various embodiments, the cargo system further includes a first configuration including the first pawl being erect, the first pivot being at the first location, and the restraining head being at a higher elevation than the first surface.

In various embodiments, the cargo system further includes an intermediate configuration spaced from the first location in a direction of the second location within the longitudinal dimension. In various embodiments, the intermediate configuration includes the restraining head being in overlying and spaced relation to the first surface.

In various embodiments, the cargo system further includes a second configuration including the first pawl being erect, the first pivot being at the second location, and the restraining head engaging the first surface.

Further, according to various embodiments of the present disclosure, a method of restraining a first structure with a cargo restraint including a first slot and a first pawl is disclosed. The first pawl includes a first pivot disposed at a fixed location on the first pawl and disposed within the first slot. The method includes moving the first pivot at a first time along the first slot to a first location; increasing an elevation of the first pivot in response to the moving the first pivot at the first time; disposing the first pawl in an erect position, where the first pawl being in the erect position with the first pivot being at the first location disposes a restraining head of the first pawl at a higher elevation than a first surface of the first structure; moving the first pivot at a second time along the first slot from the first location to a second location and with the first pawl being in the erect position, the first time being different from the second time; decreasing the elevation of the restraining head in response to the moving the first pivot at the second time; and engaging the restraining head against the first surface of the first structure during the step of decreasing the elevation of the restraining head.

In various embodiments, the method further includes changing the first pawl from a first orientation to a second orientation prior to the moving the first pivot at a first time. In various embodiments, the second orientation includes the first pawl being more erect than the first orientation.

In various embodiments, the first orientation includes the first pawl being at least generally horizontally disposed.

In various embodiments, the disposing includes the changing. In various embodiments, the disposing is executed before the moving the first pivot at a first time.

In various embodiments, the method further includes providing a single pivot axis for the first pawl. In various embodiments, the first pivot includes the single pivot axis. In various embodiments, each of the moving the first pivot at a first time and the moving the first pivot at a second time includes changing a location of the single pivot axis along the first slot.

In various embodiments, the cargo restraint further includes a second pawl. In various embodiments, the method further includes changing the second pawl from a third orientation to a fourth orientation. In various embodiments, the fourth orientation includes the second pawl being more erect than the third orientation.

In various embodiments, the third orientation includes the first pawl being at least generally horizontally disposed.

In various embodiments, the changing the second pawl is in response to the moving the first pivot at a second time.

In various embodiments, the cargo restraint further includes a second pawl. In various embodiments, the moving the first pivot at a second time includes lifting the second pawl into a latching configuration.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

FIG. 6A is a cutaway, side view of the cargo restraint of FIGS. 4A-4D with the outer and inner pawls each being in a retracted position, in accordance with various embodiments;

FIG. 6B is an enlarged side view that shows the position of one outer pawl pivot in the slot for the FIG. 6A configuration, in accordance with various embodiments;

DETAILED DESCRIPTION

Figure 1A:
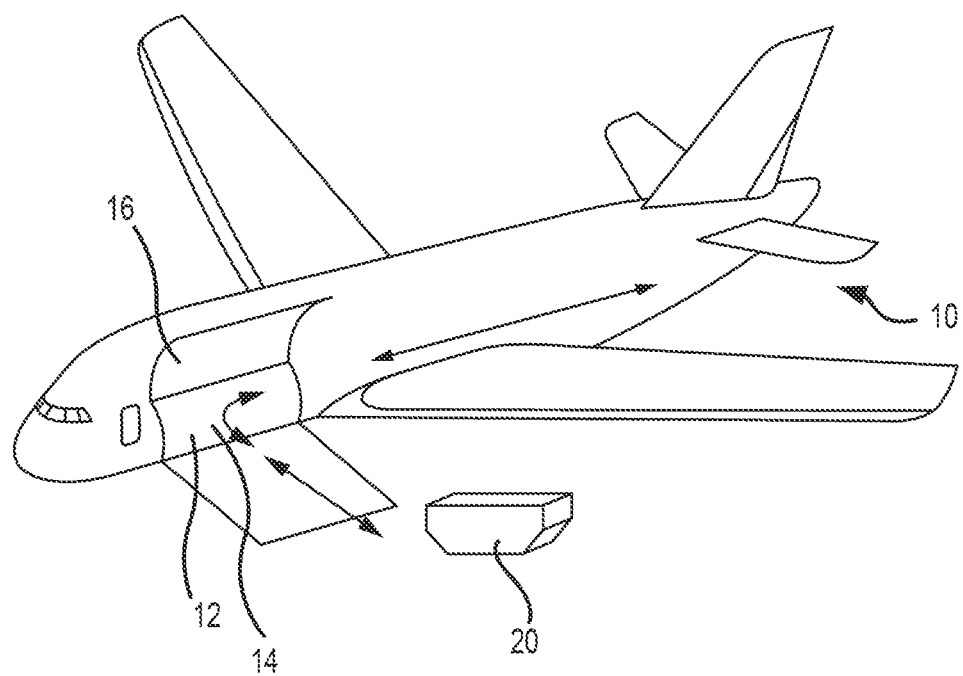
FIG. 1A illustrates a schematic of an aircraft being loaded with cargo, in accordance with various embodiments.

With reference to FIG. 1A, a schematic view of an aircraft 10 having a cargo deck 12 located within a cargo compartment 14 is illustrated, in accordance with various embodiments. The aircraft 10 may comprise a cargo load door 16 located, for example, at one side of a fuselage structure of the aircraft 10. A unit load device (ULD) 20 may be loaded through the cargo load door 16 and onto the cargo deck 12 of the aircraft 10 or, conversely, unloaded from the cargo deck 12 of the aircraft 10. In general, ULDs are available in various sizes and capacities, and are typically standardized in dimension and shape. Once loaded with items destined for shipment, the ULD 20 is transferred to the aircraft 10 and then loaded onto the aircraft 10 through the cargo load door 16 using a conveyor ramp, scissor lift or the like. Once inside the aircraft 10, the ULD 20 is moved within the cargo compartment 14 to a final stowed position. Multiple ULDs may be brought on-board the aircraft 10, with each ULD 20 being placed in a respective stowed position on the cargo deck 12. After the aircraft 10 has reached its destination, each ULD 20 is unloaded from the aircraft 10 in similar fashion, but in reverse sequence to the loading procedure. To facilitate movement of the ULD 20 along the cargo deck 12, the aircraft 10 may include a cargo handling system as described herein in accordance with various embodiments.

Figure 1B:
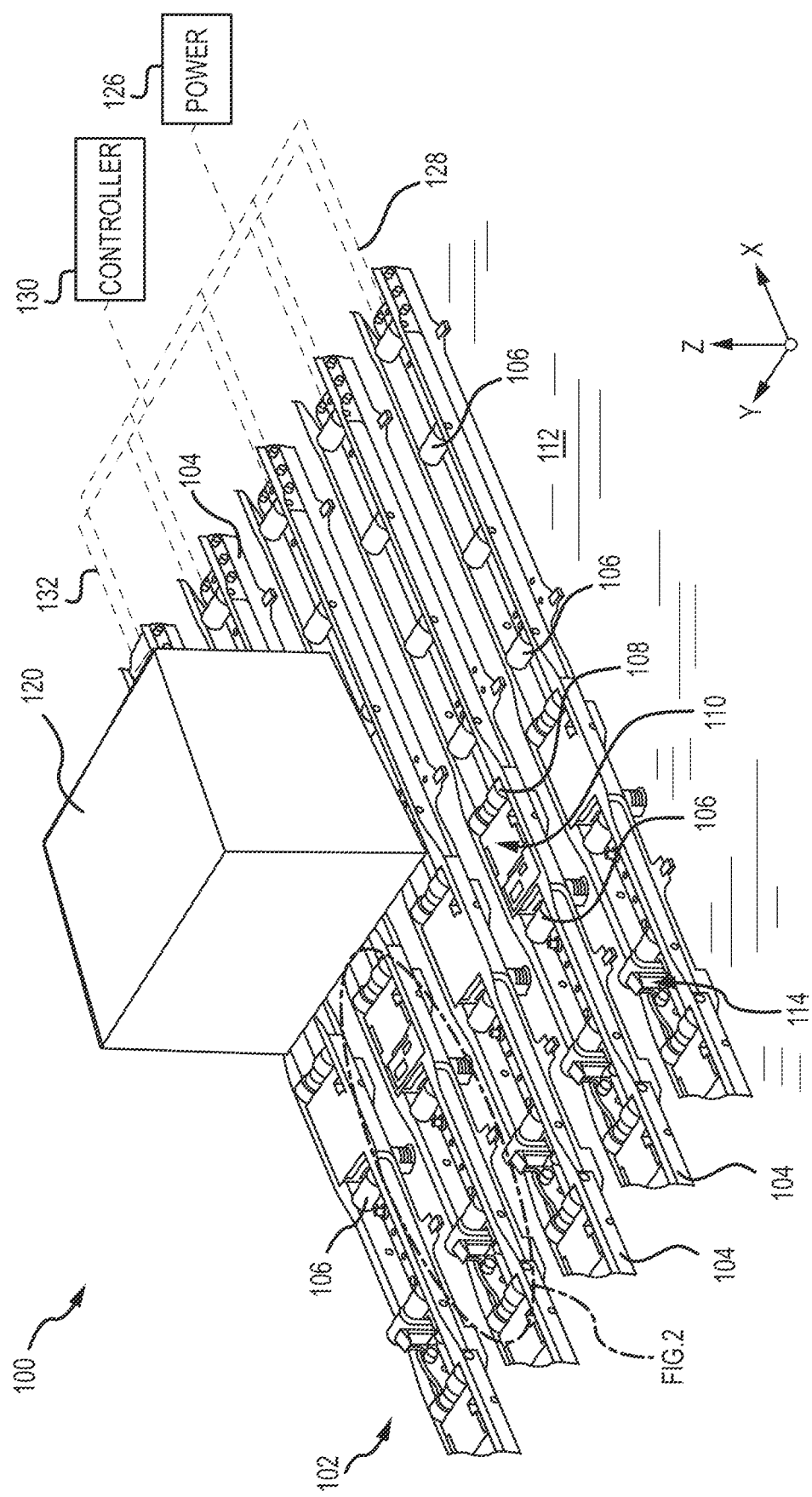
FIG. 1B illustrates a portion of a cargo handling system, in accordance with various embodiments.

Referring now to FIG. 1B, a portion of a cargo handling system 100 is illustrated, in accordance with various embodiments. The cargo handling system 100 is illustrated with reference to an XYZ coordinate system, with the X-direction extending longitudinally and the Z-direction extending vertically with respect to an aircraft in which the cargo handling system 100 is positioned, such as, for example, the aircraft 10 described above with reference to FIG. 1A. In various embodiments, the cargo handling system 100 may define a conveyance surface 102 having a plurality of trays 104 supported by a cargo deck 112, such as, for example, the cargo deck 12 described above with reference to FIG. 1A. The plurality of trays 104 may be configured to support a unit load device (ULD) 120 (or a plurality of ULDs), such as, for example, the unit load device (ULD) 20 described above with reference to FIG. 1A. In various embodiments, the ULD 120 may comprise a container or a pallet configured to hold cargo as described above. In various embodiments, the plurality of trays 104 is disposed throughout the cargo deck 112 and may support a plurality of conveyance rollers 106, where one or more or all of the plurality of conveyance rollers 106 is a passive roller.

In various embodiments, the plurality of trays 104 may further support a plurality of power drive units (PDUs) 110, each of which may include one or more drive wheels or rollers 108 that may be actively powered by a motor. In various embodiments, one or more of the plurality of trays 104 is positioned longitudinally along the cargo deck 112— e.g., along the X-direction extending from the forward end to the aft end of the aircraft. In various embodiments, the plurality of conveyance rollers 106 and the one or more drive rollers 108 may be configured to facilitate transport of the ULD 120 in the forward and the aft directions along the conveyance surface 102. During loading and unloading, the ULD 120 may variously contact the one or more drive rollers 108 to provide a motive force for transporting the ULD 120 along the conveyance surface 102. Each of the plurality of PDUs 110 may include an actuator, such as, for example, an electrically operated motor, configured to drive the one or more drive rollers 108 corresponding with each such PDU 110. In various embodiments, the one or more drive rollers 108 may be raised from a lowered position beneath the conveyance surface 102 to an elevated position protruding above the conveyance surface 102 by the corresponding PDU. As used with respect to cargo handling system 100, the term "beneath" may refer to the negative Z-direction, and the term "above" may refer to the positive Z-direction with respect to the conveyance surface 102. In the elevated position, the one or more drive rollers 108 variously contact and drive the ULD 120 that otherwise rides on the plurality of conveyance rollers 106. Other types of PDUs, which can also be used in various embodiments of the present disclosure, may include a drive roller that is held or biased in a position above the conveyance surface by a spring. PDUs as disclosed herein may be any type of electrically powered rollers that may be selectively energized to propel or drive the ULD 120 in a desired direction over the cargo deck 112 of the aircraft. The plurality of trays 104 may further support a plurality of restraint devices 114. In various embodiments, each of the plurality of restraint devices 114 may be configured to rotate downward as the ULD 120 passes over and along the conveyance surface 102. Once the ULD 120 passes over any such one of the plurality of restraint devices 114, such restraint device 114 returns to its upright position, either by a motor driven actuator or a bias member, thereby restraining or preventing the ULD 120 from translating in the opposite direction.

In various embodiments, the cargo handling system 100 may include a system controller 130 in communication with each of the plurality of PDUs 110 via a plurality of channels 132. Each of the plurality of channels 132 may be a data bus, such as, for example, a controller area network (CAN) bus. An operator may selectively control operation of the plurality of PDUs 110 using the system controller 130. In various embodiments, the system controller 130 may be configured to selectively activate or deactivate the plurality of PDUs 110. Thus, the cargo handling system 100 may receive operator input through the system controller 130 to control the plurality of PDUs 110 in order to manipulate movement of the ULD 120 over the conveyance surface 102 and into a desired position on the cargo deck 112. In various embodiments, the system controller 130 may include a general purpose processor, a digital signal processor (DSP), an application specific integrated circuit (ASIC), a field programmable gate array (FPGA) or some other programmable logic device, discrete gate or transistor logic, discrete hardware components, or any combination thereof. The cargo handling system 100 may also include a power source 126 configured to supply power to the plurality of PDUs 110 or to the plurality of restraint devices 114 via one or more power busses 128. The system controller 130 may be complimented by or substituted with an agent-based control system, whereby control of each PDU and associated componentry—e.g., the restraint devices—is performed by individual unit controllers associated with each of the PDUs and configured to communicate between each other.

Figure 2:
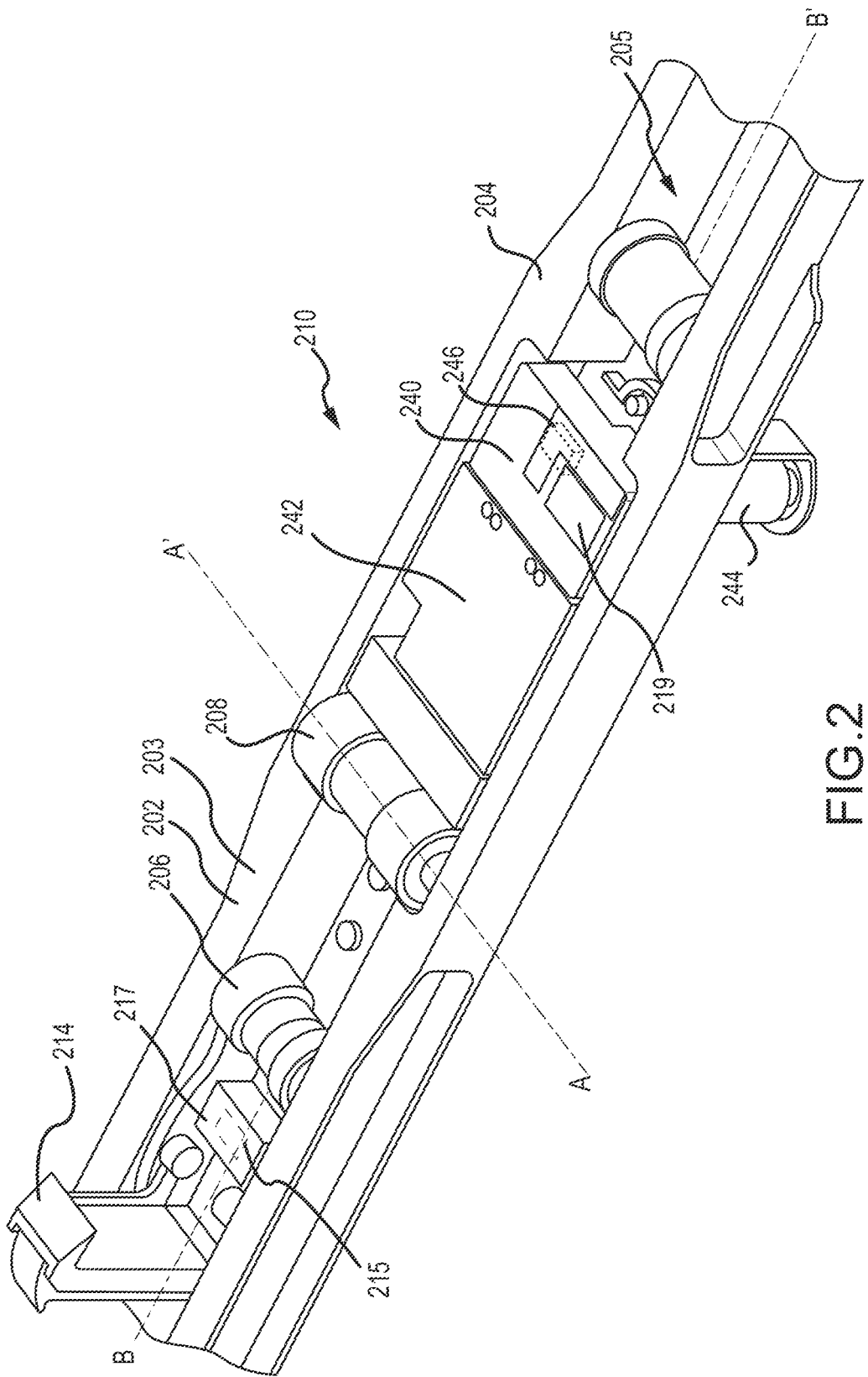
FIG. 2 illustrates a portion of a cargo handling system, in accordance with various embodiments.

Referring now to FIG. 2, a PDU 210, such as for example, one of the plurality of PDUs 110 described above with reference to FIG. 1B, is illustrated disposed in a tray 204, in accordance with various embodiments. The PDU 210 may rotate the drive roller 208 in one of two possible directions (e.g., clockwise or counterclockwise) to move the ULD in a direction parallel to the longitudinal axis B-B' of the tray 204 or in a direction that is perpendicular to the longitudinal axis B-B'. The PDU 210 may comprise a unit controller 240, a unit motor 242 and a drive roller 208 mounted within an interior section 205 of the tray 204. The drive roller 208 may comprise a cylindrical wheel coupled to a drive shaft and configured to rotate about an axis A-A'. The drive roller 208 may be in mechanical communication with the unit motor 242, which may be, for example, an electromagnetic, electromechanical or electrohydraulic actuator or other servomechanism. The PDU 210 may further include gear assemblies and other related components for turning or raising the drive roller 208 so that the drive roller 208 may extend, at least partially, above a conveyance surface 202 which, in various embodiments, may be defined as the uppermost surface 203 of the tray 204. At least partial extension of the drive roller 208 above the conveyance surface 202 facilitates contact between the drive roller 208 and a lower surface of a ULD, such as, for example, the ULD 120 described above with reference to FIG. 1B. In various embodiments, the unit controller 240 is configured to control operation of the drive roller 208. The unit controller 240 may include a processor and a tangible, non-transitory memory. The processor may comprise one or more logic modules that implement logic to control rotation and elevation of the drive roller 208. In various embodiments, the PDU 210 may comprise other electrical devices to implement drive logic. In various embodiments, a connector 244 is used to couple the electronics of the PDU 210 to a power source and a system controller, such as, for example, the system controller 130 described above with reference to FIG. 1B. The connector 244 may have pins or slots and may be configured to couple to a wiring harness having pin programing. The unit controller 240 may be configured to receive commands from the system controller through the connector 244 in order to control operation of the unit motor 242.

In addition, a restraint device 214, such as, for example, one of the plurality of restraint devices 114 described above with reference to FIG. 1B, is illustrated as disposed within the tray 204 and configured to operate between a stowed position, whereby the ULD may pass over the restraint device, and a deployed position (as illustrated), whereby the ULD is restrained or prevented from translation in a longitudinal direction (e.g., along a longitudinal axis B-B') without the restraint device 214 first being returned to the stowed position. The restraint device 214 includes a restraint controller 215 and a restraint motor 217. In various embodiments, the restraint device 214 may be in mechanical communication with the restraint motor 217, which may be, for example, an electromagnetic, electromechanical or electrohydraulic actuator or other servomechanism. In various embodiments, the restraint controller 215 is configured to control operation of the restraint device 214. The restraint controller 215 may include a processor and a tangible, non-transitory memory. The processor may comprise one or more logic modules that implement logic to control operation of the restraint device 214 between the stowed and the deployed positions.

In various embodiments, the PDU 210 may also include a radio frequency identification device or RFID device 246, or similar device, configured to store, transmit or receive information or data—e.g., operational status or location data. Additionally, a ULD sensor 219 may be disposed within the tray 204 and configured to detect the presence of a ULD as the ULD is positioned over or proximate to the PDU 210 or the restraint device 214. In various embodiments, the ULD sensor 219 may include any type of sensor capable of detecting the presence of a ULD. For example, in various embodiments, the ULD sensor 219 may comprise a proximity sensor, a capacitive sensor, a capacitive displacement sensor, a Doppler effect sensor, an eddy-current sensor, a laser rangefinder sensor, a magnetic sensor, an active or passive optical sensor, an active or passive thermal sensor, a photocell sensor, a radar sensor, a sonar sensor, a lidar sensor, an ultrasonic sensor or the like.

Figure 3:
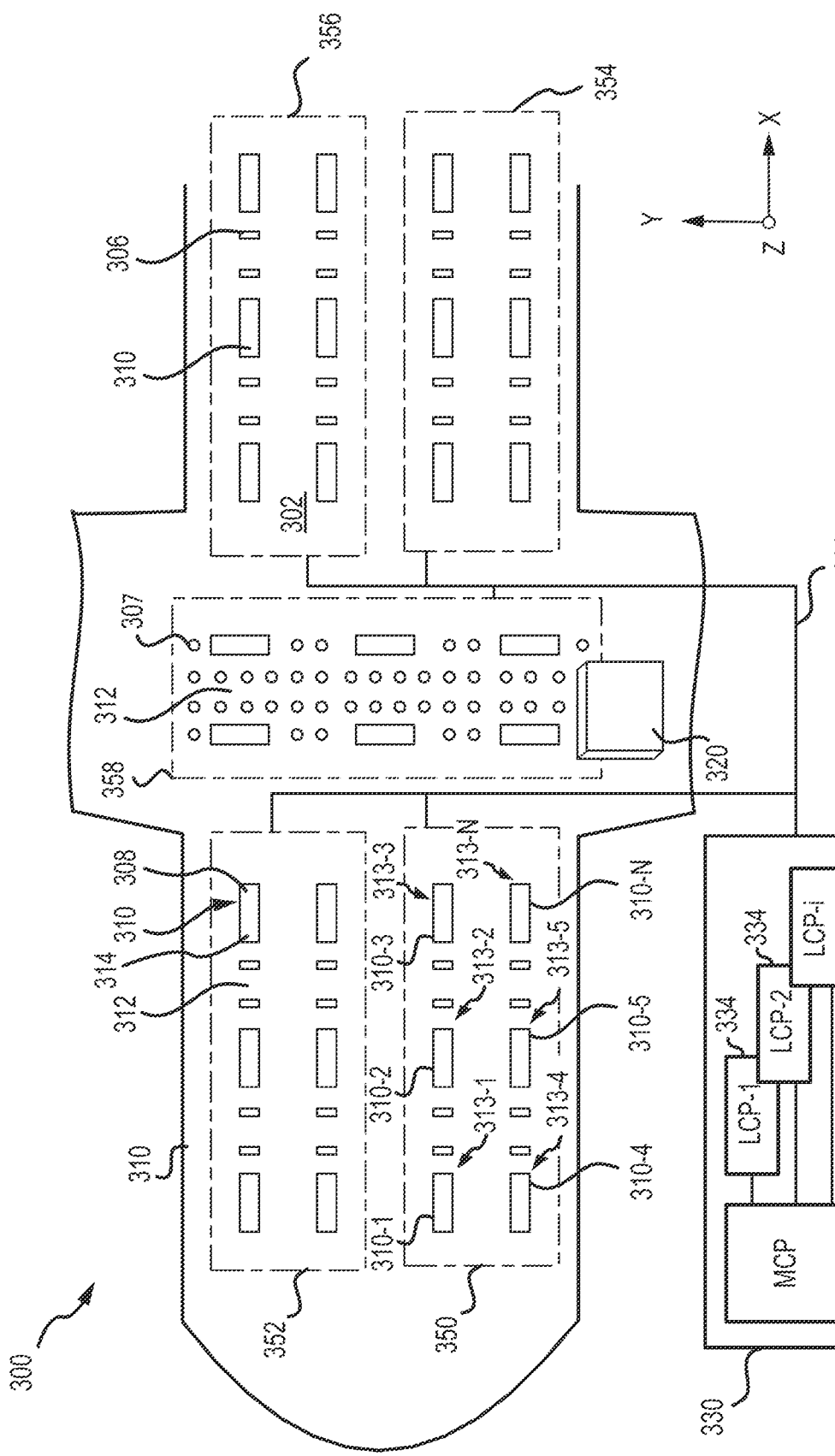
FIG. 3 illustrates a schematic view of a cargo deck having a cargo handling system with a plurality of PDUs, in accordance with various embodiments.
Figure 4A:
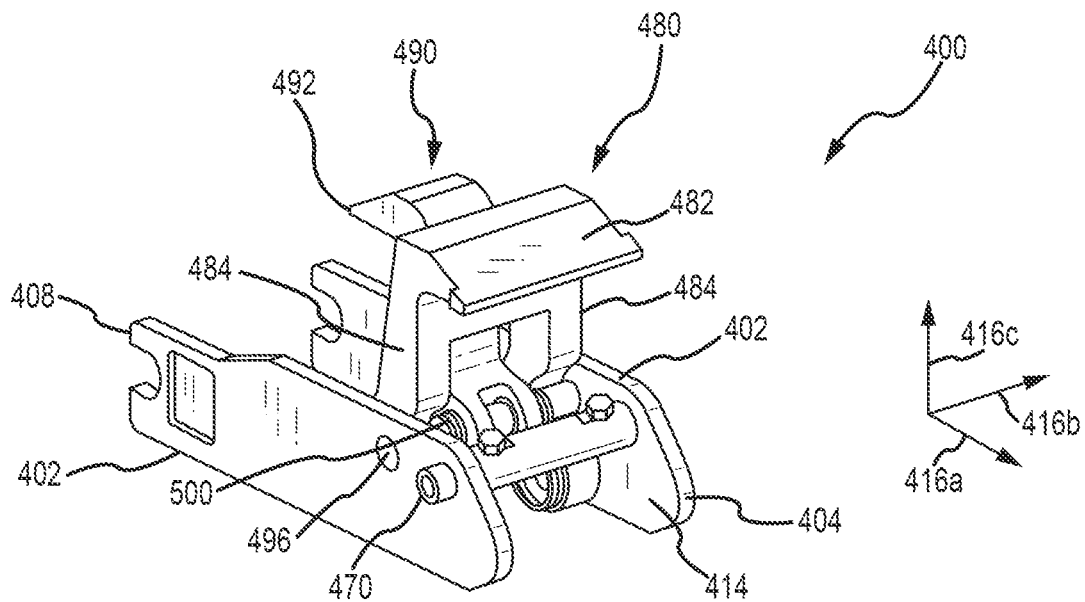
FIG. 4A is a perspective view of a cargo restraint having outer and inner pawls in an erected position, in accordance with various embodiments.
Figure 4B:
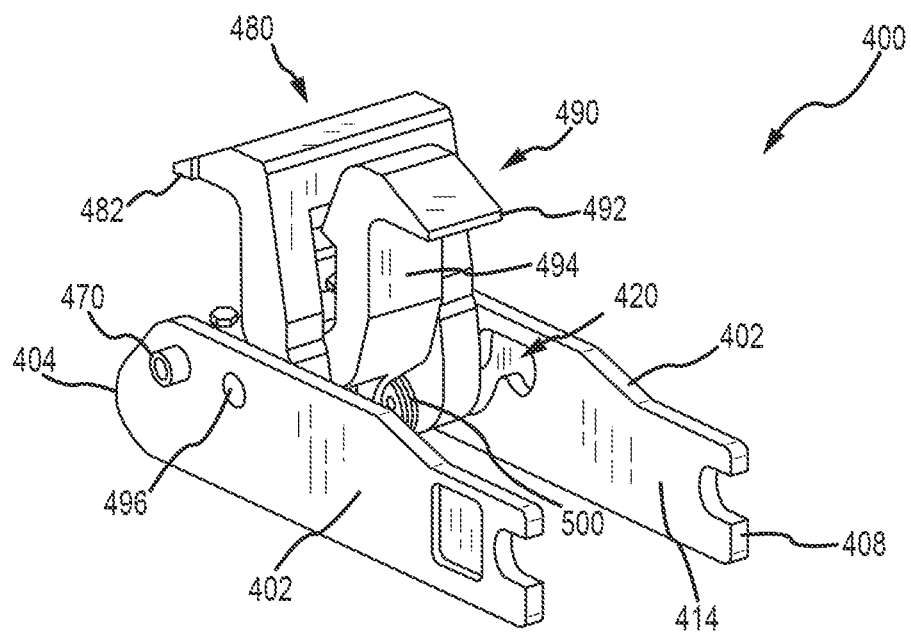
FIG. 4B is another perspective view of the cargo restraint in the FIG. 4A configuration, in accordance with various embodiments.
Figure 4C:
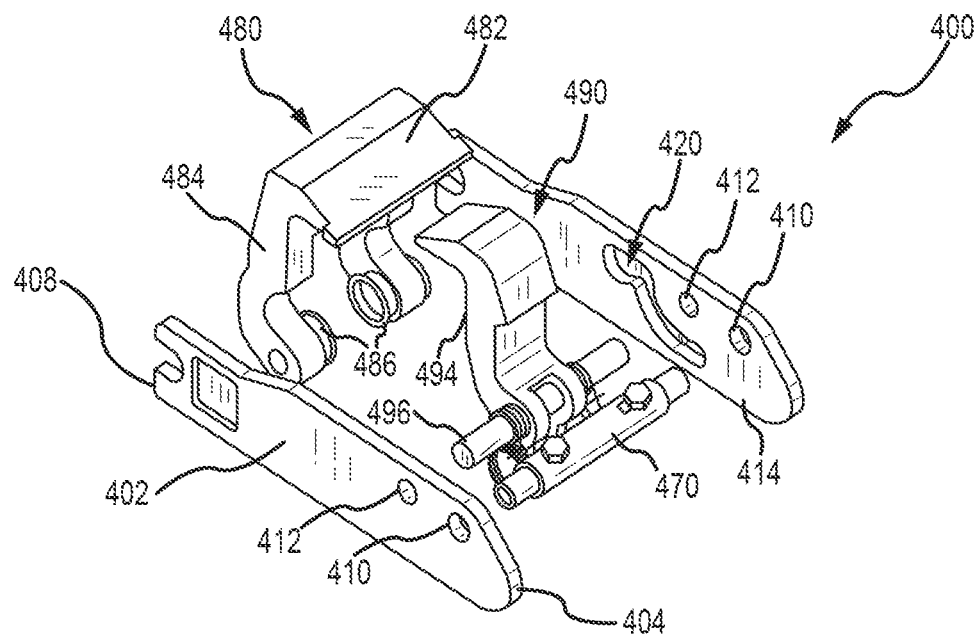
FIG. 4C is an exploded, perspective view of the cargo restraint of FIG. 4A, in accordance with various embodiments.
Figure 4D:
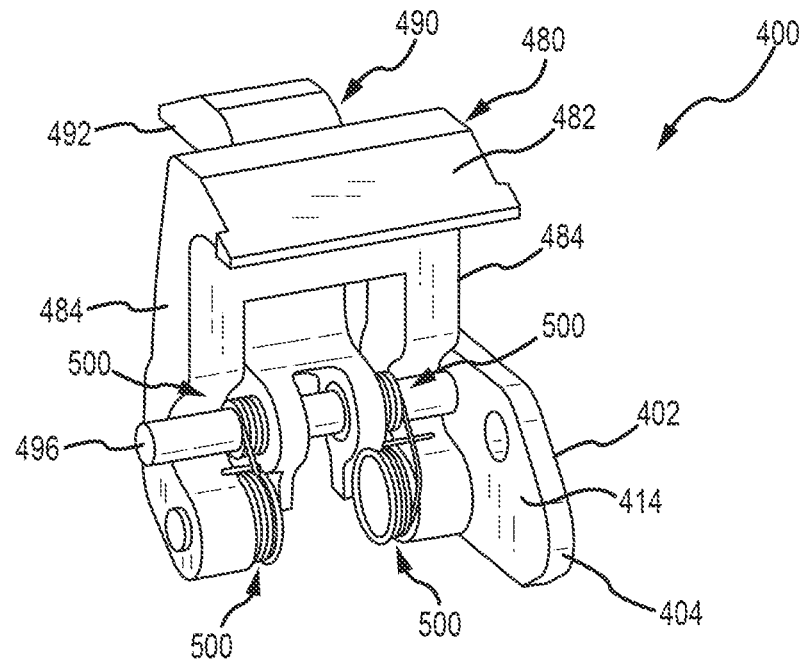
FIG. 4D is a perspective view of the cargo restraint of FIG. 4A that illustrates a spring between the outer and inner pawls, in accordance with various embodiments.

Referring now to FIG. 3, a schematic view of a cargo handling system 300 positioned on a cargo deck 312 of an aircraft is illustrated, in accordance with various embodiments. The cargo deck 312 may comprise a plurality of PDUs 310, generally arranged in a matrix configuration about the cargo deck 312. Associated with each of the plurality of PDUs 310 may be one or more drive rollers 308 and a restraint device 314. In various embodiments, the plurality of PDUs 310, the one or more drive rollers 308 and the restraint device 314 share similar characteristics and modes of operation as the PDU 210, drive roller 208 and restraint device 214 described above with reference to FIG. 2. Each of the one or more drive rollers 308 is generally configured to selectively protrude from a conveyance surface 302 of the cargo deck 312 in order to engage with a surface of a ULD 320 as it is guided onto and over the conveyance surface 302 during loading and unloading operations. A plurality of conveyance rollers 306 may be arranged among the plurality of PDUs 310 in a matrix configuration as well. The plurality of conveyance rollers 306 may comprise passive elements, and may include roller ball units 307 that serve as stabilizing and guiding apparatus for the ULD 320 as it is conveyed over the conveyance surface 302 by the plurality of PDUs 310.

In various embodiments, the cargo handling system 300 or, more particularly, the conveyance surface 302, is divided into a plurality of sections. As illustrated, for example, the conveyance surface 302 may include a port-side track and a starboard-side track along which a plurality of ULDs may be stowed in parallel columns during flight. Further, the conveyance surface 302 may be divided into an aft section and a forward section. Thus, the port-side and starboard-side tracks, in various embodiments and as illustrated, may be divided into four sections—e.g., a forward port-side section 350, a forward starboard-side section 352, an aft port-side section 354 and an aft starboard-side section 356. The conveyance surface 302 may also have a lateral section 358, which may be used to transport the ULD 320 onto and off of the conveyance surface 302 as well as transfer the ULD 320 between the port-side and starboard-side tracks and between the aft section and the forward section. The configurations described above and illustrated in FIG. 3 are exemplary only and may be varied depending on the context, including the numbers of the various components used to convey the ULD 320 over the conveyance surface 302. In various embodiments, for example, configurations having three or more track configurations, rather than the two-track configuration illustrated in FIG. 3, may be employed.

Each of the aforementioned sections—i.e., the forward port-side section 350, the forward starboard-side section 352, the aft port-side section 354 and the aft starboard-side section 356—may include one or more of the plurality of PDUs 310. Each one of the plurality of PDUs 310 has a physical location on the conveyance surface 302 that corresponds to a logical address within the cargo handling system 300. For purposes of illustration, the forward port-side section 350 is shown having a first PDU 310-1, a second PDU 310-2, a third PDU 310-3, a fourth PDU 310-4, a fifth PDU 310-5 and an N-th PDU 310-N. The aforementioned individual PDUs are located, respectively, at a first location 313-1, a second location 313-2, a third location 313-3, a fourth location 313-4, a fifth location 313-5 and an N-th location 313-N. In various embodiments, the location of each of the aforementioned individual PDUs on the conveyance surface 302 may have a unique location (or address) identifier, which, in various embodiments, may be stored in an RFID device, such as, for example, the RFID device 246 described above with reference to FIG. 2.

In various embodiments, an operator may control operation of the plurality of PDUs 310 using one or more control interfaces of a system controller 330, such as, for example, the system controller 130 described above with reference to FIG. 1B. For example, an operator may selectively control the operation of the plurality of PDUs 310 through an interface, such as, for example, a master control panel (MCP) 331. In various embodiments, the cargo handling system 300 may also include one or more local control panels (LCP) 334. In various embodiments, the master control panel 331 may communicate with the local control panels 334. The master control panel 331 or the local control panels 334 may also be configured to communicate with or send or receive control signals or command signals to or from each of the plurality of PDUs 310 or to a subset of the plurality of PDUs 310, such as, for example, the aforementioned individual PDUs described above with reference to the forward port-side section 350. For example, a first local control panel LCP-1 may be configured to communicate with the PDUs residing in the forward port-side section 350, a second local control panel LCP-2 may be configured to communicate with the PDUs residing in the forward starboard-side section 352, and one or more additional local control panels LCP-i may be in communication with the PDUs of one or more of the aft port-side section 354, the aft starboard-side section 356 and the lateral section 358. Thus, the master control panel 331 or local control panels 334 may be configured to allow an operator to selectively engage or activate one or more of the plurality of PDUs 310 to propel the ULD 320 along conveyance surface 302.

In various embodiments, each of the plurality of PDUs 310 may be configured to receive a command from the master control panel 331 or one or more of the local control panels 334. In various embodiments, the commands may be sent or information exchanged over a channel 332, which may provide a communication link between the system controller 330 and each of the plurality of PDUs 310. In various embodiments, a command signal sent from the system controller 330 may include one or more logical addresses, each of which may correspond to a physical address of one of the plurality of PDUs 310. Each of the plurality of PDUs 310 that receives the command signal may determine if the command signal is intended for that particular PDU by comparing its own address to the address included in the command signal.

A cargo restraint is illustrated in FIG. 4A-4D, is identified by reference numeral 400, and may be used in place of the restraint devices 114 of FIG. 1B, the restraint device 214 of FIG. 2, or by any other appropriate cargo handling system (e.g., for an aircraft). The cargo restraint 400 includes a pair of sidewalls 402 that are spaced from one another in a lateral or width dimension 416b for the cargo restraint 400. Additional components of the cargo restraint 400 include an outer pawl or latch 480 (or a first pawl/latch 480) having a restraining head 482, an inner pawl or latch 490 (or a second pawl/latch 490) having a restraining head 492, and a retention pin 470.

The cargo restraint 400 may be characterized as having a first end 404 and a second end 408 that are spaced from one another along a longitudinal dimension 416a of the cargo restraint 400. Each sidewall 402 includes an aperture 410 that extends into/through the corresponding sidewall 402 for mounting of the noted retention pin 470 to the sidewalls 402. The inner pawl 490 is pivotally connected to the sidewalls 402 by a pivot pin 496 and is movable between a retracted position (e.g., FIG. 6A) and an erected position (e.g., FIG. 10A) in a manner that will be discussed in more detail below. The inner pawl 490 includes a leg 494, with the restraining head 492 being on a distal end of this leg 494, and with the pivot pin 496 extending through a more proximal portion of the leg 494 and into/through an aperture 412 in the corresponding sidewall 402. This pivotal connection between the inner pawl 490 and the sidewalls 402 is at a fixed location relative to the sidewalls 402 of the cargo restraint 400—the location of the pivotal axis between the inner pawl 490 and the sidewalls 402 does not move during operation of the cargo restraint 400.

The outer pawl 480 is also movably interconnected with the sidewalls 402. In this regard, an inner surface 414 of each of the sidewalls 402 includes a similarly-configured slot or groove 420 that may be characterized as being cam-shaped—at least one surface of the slot 420 is shaped to induce a certain motion of the outer pawl 480 (more specifically its pivots 486) to change the elevation of a pivotal interconnection between the outer pawl 480 and the sidewalls 402 in a manner that will be discussed in more detail below. The outer pawl 480 includes a pair of legs 484 that are spaced in the lateral (or width) dimension 416b. Each leg 484 includes a pivot 486 that extends into the slot 420 of the corresponding sidewall 402 and that is maintained in a fixed location on/along the corresponding leg 484 of the outer pawl 480. The pivots 486 are movable along the length dimension of the corresponding slot 420 to change the elevation (in a vertical dimension 416c) of at least part of the outer pawl 480 and including the pivots 486. The pivots 486 define a single pivot axis between the outer pawl 480 and the sidewalls 402.

Figure 5A:
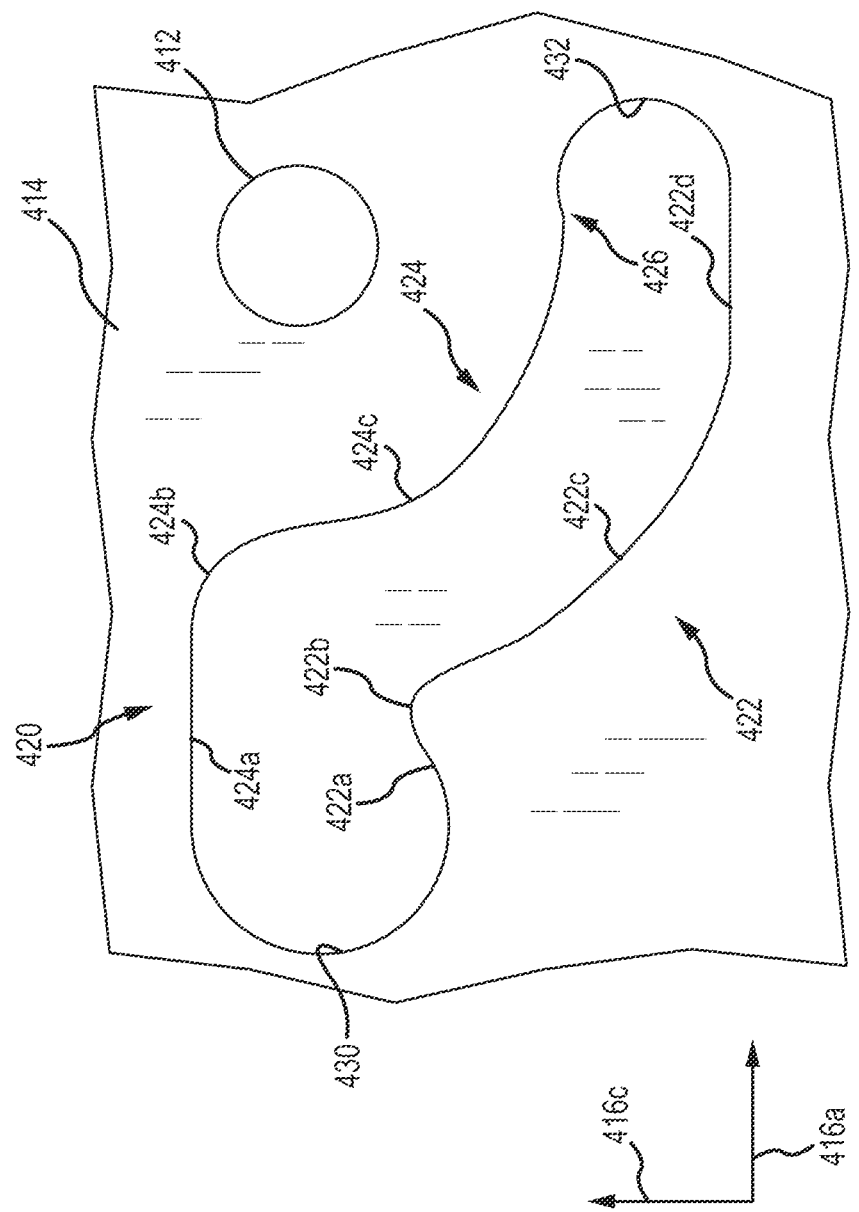
FIG. 5A is an enlarged view of a slot used to control the elevation of the outer pawl of the cargo restraint of FIGS. 4A-4D, in accordance with various embodiments.

Details of the slot 420 in the inner surface 414 for one of the sidewalls 402 are presented in FIG. 5A. The slot 420 includes a lower sidewall 422 and an upper sidewall 424 that are spaced in the vertical dimension 416c for the cargo restraint 400, along with a first end 430 and a second end 432 that are spaced in the longitudinal dimension 416a for the cargo restraint 400. The lower sidewall 422 for each of the slots 420 includes a first segment 422a (e.g., a curved surface) that extends both upwardly (in the vertical dimension 416c) and in the longitudinal dimension 416a proceeding from the first end 430 (e.g., semi-circular) to a second segment 422b (a convex surface relative to the interior of the slot 420; an apex or a bump), along with a third segment 422c (e.g., a curved surface) that extends both downwardly (in the vertical dimension 416c) and also in the longitudinal dimension 416a proceeding from the second segment 422b to a fourth segment 422d. The fourth segment 422d may be at least generally horizontally disposed but in any case extends in the longitudinal dimension proceeding from the third segment 422c to the second end 432 (e.g., semi-circular) of the slot 420.

Continuing to refer to FIG. 5A, the upper sidewall 424 for each of the slots 420 includes a first segment 424a that extends from the first end 430 to a second segment 424b at least generally in the longitudinal dimension 416a. The first segment 424a may be at least generally horizontally disposed. The second segment 424b may be curved (a concave surface relative to the interior of the slot 420). A third segment 424c (e.g., a curved surface) extends both downwardly (in the vertical dimension 416c and in the longitudinal dimension 416a proceeding from the second segment 424b in the direction of the second end 432 of the slot 420. The second end 432 again may be defined by a radius. The second end 432 may extend past a longitudinal position of the center of this radius to interconnect with the third segment 424c to define a stopper 426. The stopper 426 may be convex relative to the interior of the slot 420, and in any case should assist with retention of a corresponding pivot 486 (outer pawl 480) at the second end 432 of the slot 420 (e.g., the stopper 426 may provide a snap-lock of sorts to at least assisting with retaining a corresponding pivot 486 of the outer pawl 480 at the second end 432 of the slot 420—a latched configuration for the outer pawl 480).

Figure 5B:
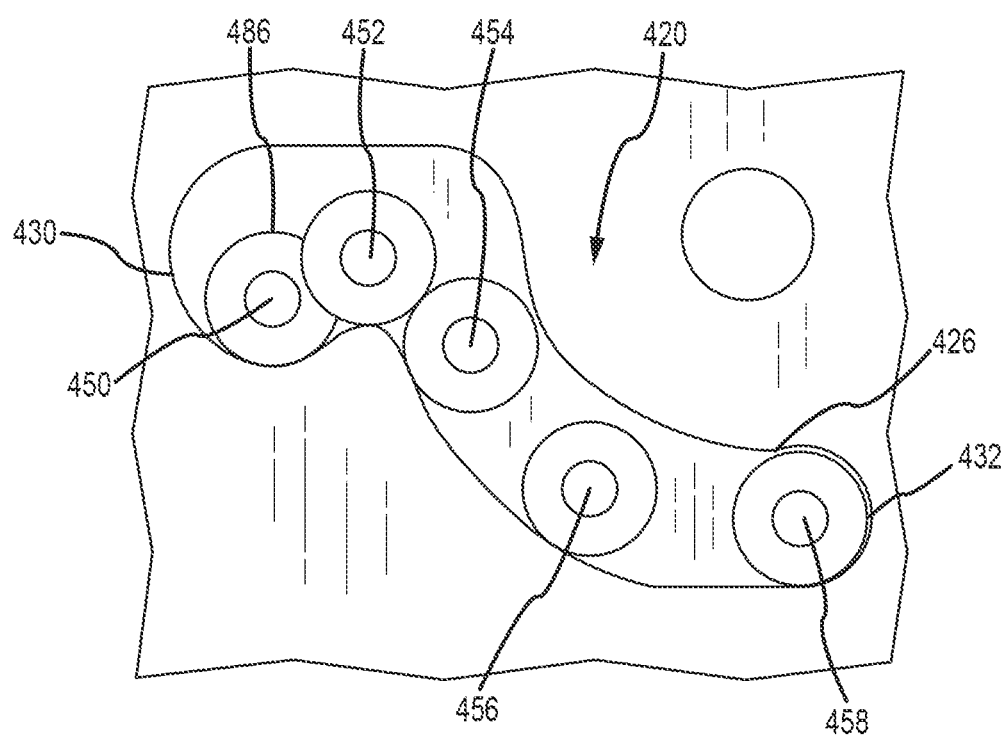
FIG. 5B is a side view of the slot shown in FIG. 5A that illustrates representative positions of a pivot pin of the outer pawl in the slot, in accordance with various embodiments.

Representative pivot positions for a given pivot 486 (outer pawl 480) within a corresponding slot 420 are presented in FIG. 5B. In a first pivot position 450, the pivot 486 is located at the intersection between the first end 430 of the slot 420 and the first segment 422a and that is in the form of a concave surface relative to the interior of the slot 420 (also referred to herein as a "home location 450"). In a second pivot position 452, the pivot 486 is located on the second segment (apex or bump) 422b of the lower sidewall 422 of the slot 420 (also referred to herein as a "first location 452"). In a third pivot position 454, the pivot 486 is positioned at an upper portion of the third segment 422c of the lower sidewall 422 of the slot 420. In a fourth pivot position 456, the pivot 486 is positioned at a lower portion of the third segment 422c of the lower sidewall 422 of the slot 420. Finally, in a fifth pivot position 458 (also referred to herein as a "second location 458"), the pivot 486 is disposed at the second end 432 of the slot 420.

A left end section of the slot 420 in the view of FIG. 5A (including the first end 430 and extending in the direction of the bump or second segment 422b) may be characterized as a "retracted region" for the outer pawl 480. A right end section of the slot 420 in the view of FIG. 5A (including the fourth segment 422c and the second end 432) may be characterized as an "erected region" for the outer pawl 480. An intermediate section of the slot 420, that extends between the above-noted left end section and right end section of the slot 420, and that includes the third segment 422c, may be characterized as a "translation region" for the outer pawl 480. Note in FIG. 5B that the home location/first pivot position 450 is disposed at a lower elevation in the vertical dimension 416c compared to the first location/second pivot position 452. As such, the elevation of the pivot 486 will be increased proceeding from the home location/first pivot position 450 to the first location/second pivot position 452. The second location/fifth pivot position 458 is disposed at a lower elevation in the vertical dimension 416c compared to the first location/second pivot position 452 (the second location/fifth pivot position 458 is also disposed at a lower elevation in the vertical dimension 416c compared to the home location/first pivot position 450). As such, the elevation of the pivot 486 will be decreased proceeding from the first location/second pivot position 452 in the direction of the second location/fifth pivot position 458. The pivot 486 will move primarily in the longitudinal dimension 416a (e.g., horizontally, if the cargo restraint 400 is disposed on a horizontal surface) when proceeding along the fourth segment 422d until engaging the second end 432.

FIG. 6A illustrates the outer pawl 480 and the inner pawl 490 each being in a retracted position. At this time the pivots 486 for the outer pawl 480 are disposed in the home location/first pivot position 450 (FIG. 6B). The pivots 486 are at least somewhat restrained in the longitudinal dimension 416a when disposed in the home location/first pivot position 450. Note that a proximal end of the inner pawl 490 may be engaged with the retention pin 470 when it is fully retracted position.

Figure 7A:
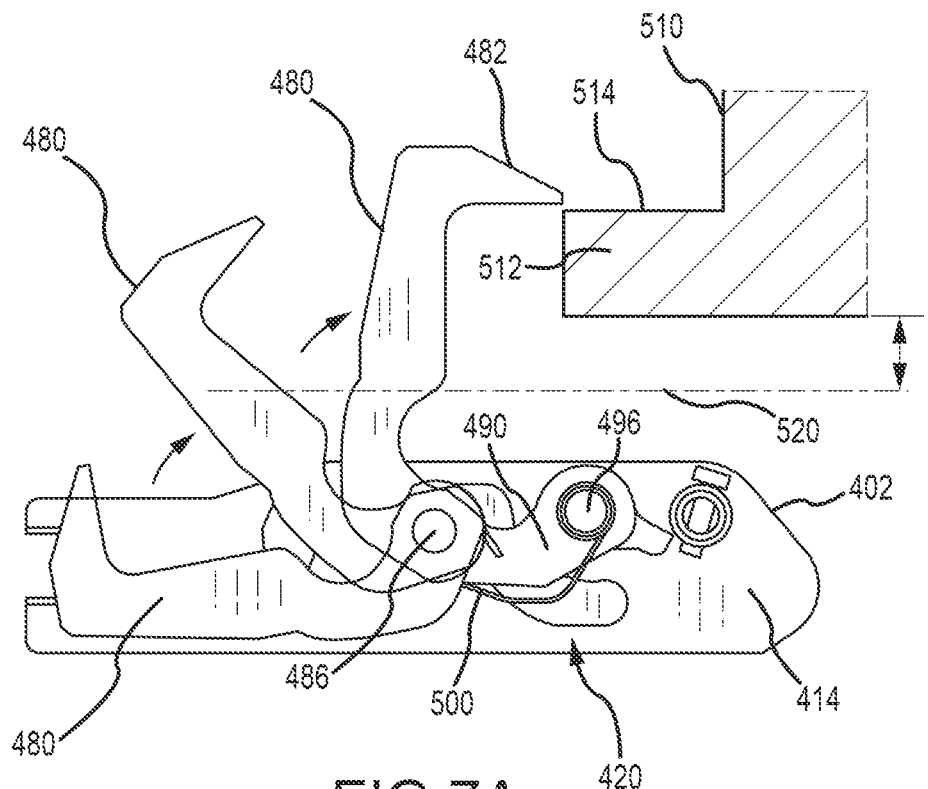
FIG. 7A is a cutaway, side view of the cargo restraint of FIGS. 4A-4D with the outer pawl being moved from a retracted position to an erected position, in accordance with various embodiments.
Figure 7B:
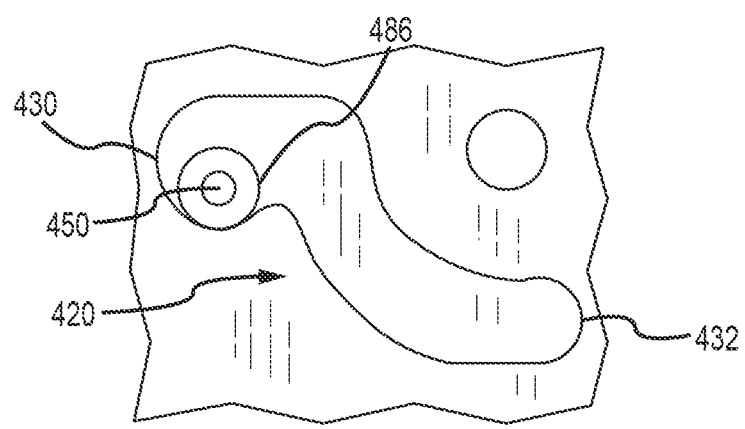
FIG. 7B is an enlarged side view that shows the position of one outer pawl pivot in the slot for the FIG. 7A configuration, in accordance with various embodiments.

FIG. 7A illustrates movement of the outer pawl 480 from the retracted position (also shown in FIG. 6A) to an erected position. At this time the pivots 486 for the outer pawl 480 may remain in the home location/first pivot position 450 (FIG. 7B). This movement of the outer pawl 480 is primarily a pivotal motion relative to the sidewalls 402 and about the pivots 486 (again defining a single pivotal axis between the outer pawl 480 and the sidewalls 402 of the cargo restraint 400). An operator may manually move the outer pawl 480 from the retracted position to the erected position in the direction indicated by the arrows shown in FIG. 7A.

FIG. 7A also illustrates a first structure or a until load device (ULD) 510. A "ULD", as used herein, includes a container, pallet, or other cargo of any size, shape, configuration, and/or type. A lower portion of the ULD 510 includes what may be characterized as a retention base, rim, rim segment, or flange 512. Note that a lower surface of the retention base 512 is disposed at a higher elevation in the vertical dimension 416c than a conveyor plane 520 (e.g., typically due to the retention base 512 being bent or otherwise distorted—not shown in FIG. 7A). This offset is identified by the double-headed arrow in FIG. 7A. The conveyor plane 520 at least generally corresponds with a surface (e.g., a cargo deck) along which the ULD 510 is moved in a cargo compartment.

A lower surface of the restraining head 482 of the outer pawl 480 in the FIG. 7A configuration could be disposed at generally the same elevation (in the vertical dimension 416c) as a first or restrained surface 514 of the retention base 512, could be disposed at a slightly higher elevation (in the vertical dimension 416c) compared to the restrained surface 514 of the retention base 512 (FIG. 7A), or could even be disposed at a slightly lower elevation (in the vertical dimension 416c) compared to the restrained surface 514 of the retention base 512 (not shown). In any case, the restraining head 482 will typically be disposed in proximity to an outer perimeter of the retention base 512 in the configuration shown in FIG. 7A-7B.

Figure 8A:
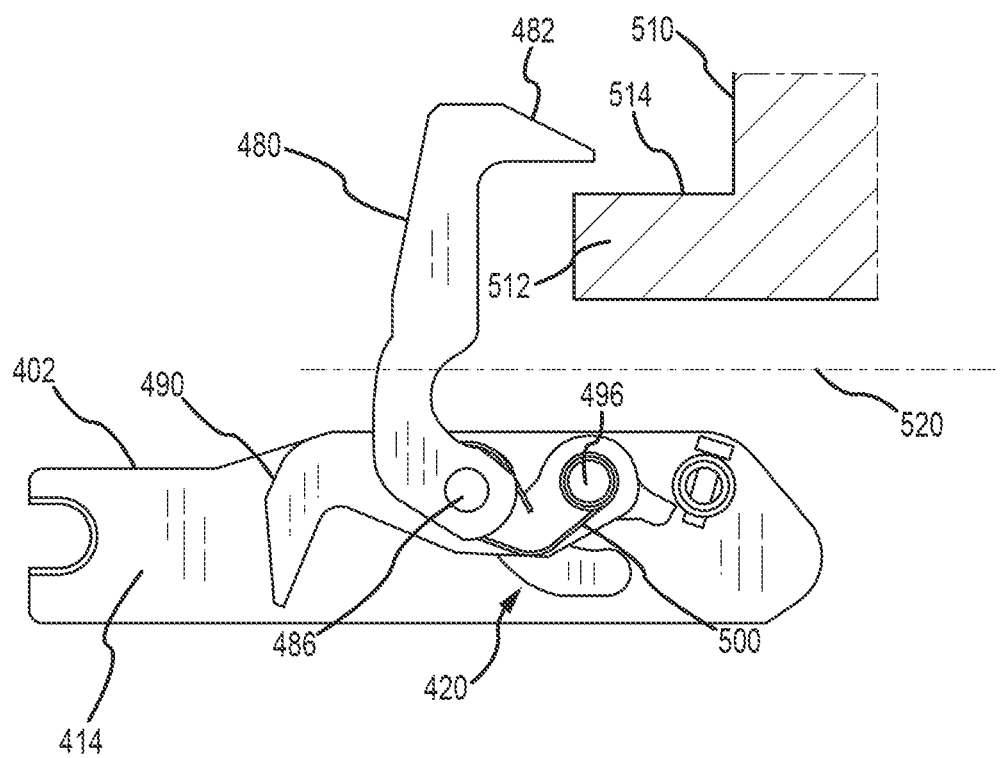
FIG. 8A is a cutaway, side view of the cargo restraint of FIGS. 4A-4D with the outer pawl being in an erected position and with the outer pawl having been moved to its maximum elevated position to accommodate engagement of a retention base of a ULD that is disposed above a conveyor plane, in accordance with various embodiments.
Figure 8B:
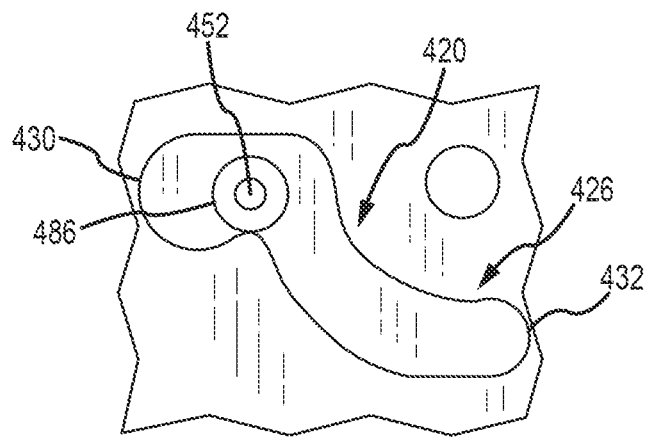
FIG. 8B is an enlarged side view that shows the position of one outer pawl pivot in the slot for the FIG. 8A configuration, in accordance with various embodiments.

An operator may lift the outer pawl 480, from the erected position shown in FIG. 7A to the position shown in FIG. 8A, to increase the elevation of the restraining head 482 of the outer pawl 480. The entirety of the outer pawl 480 (including the pivots 486) may be moved in the vertical dimension 416c (as well as in the longitudinal dimension 416a) by the pivots 486 moving along the first segment 422a of the lower sidewall 422 of the slot 420 and with the outer pawl 480 being in the erected position. However, the outer pawl 480 could also be moved from its retracted position to its erected position in conjunction with moving the pivots 486 within the slot 420 from the first pin position 450 (e.g., FIGS. 6A and 7A) to the second pin position 452 (FIG. 8B). In any case, the noted movement of the outer pawl 480 disposes the pivots 486 at the first location/second pin position 452 shown in FIG. 8B (at the second segment, apex, or bump 422b). Note the increased elevation of the restraining head 482 shown in FIG. 8A compared to FIG. 7A (i.e., a lower surface of the restraining head 482 is spaced further from the conveyor plane 520 in FIG. 8A compared to FIG. 7A), where the noted elevation increase is within the vertical dimension 416c and including such that the lower surface of the restraining head 482 is disposed at a higher elevation than the retention base 512 of the ULD 510 in the FIG. 8A configuration. Further note that at least a distal portion of the restraining head 482 may be disposed in overlying relation (e.g., above) to the retention base 512 and including being in vertically spaced relation to the retention base 512 (with the pivots 486 being in the second pin position 452).

Figure 9A:
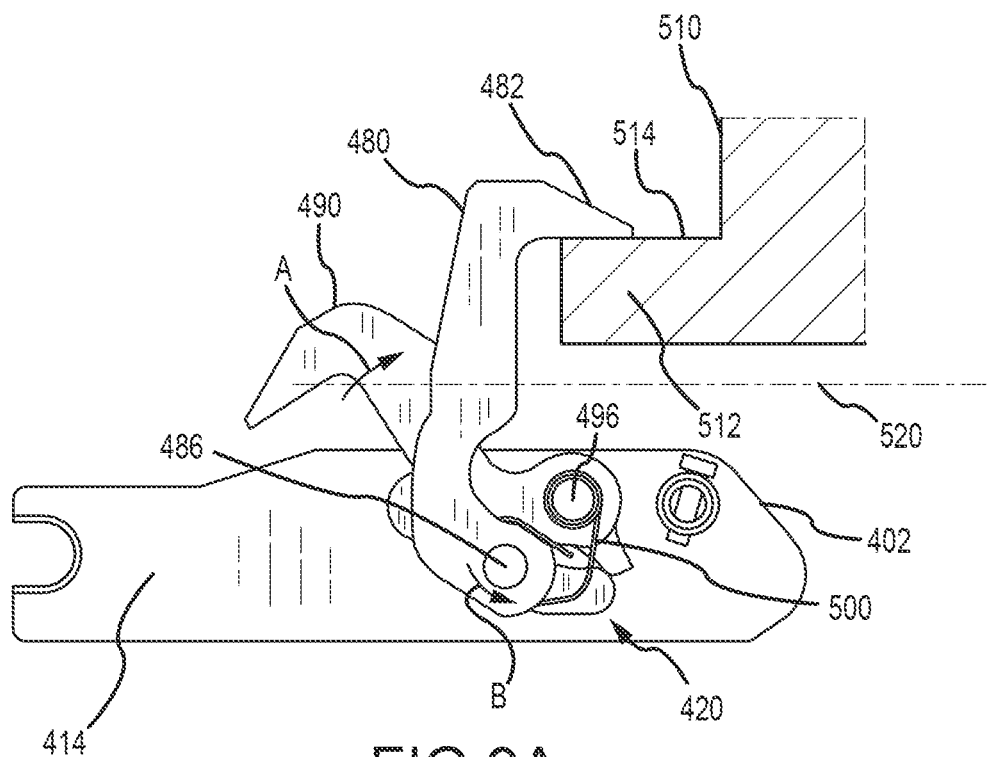
FIG. 9A is a cutaway, side view of the cargo restraint of FIGS. 4A-4D with the outer pawl being in an erected position, with the restraining head of the outer pawl having engaged the retention base of the ULD and having moved the retention base toward a conveyor plane, and with the inner pawl being moved toward its erected position, in accordance with various embodiments.
Figure 9B:
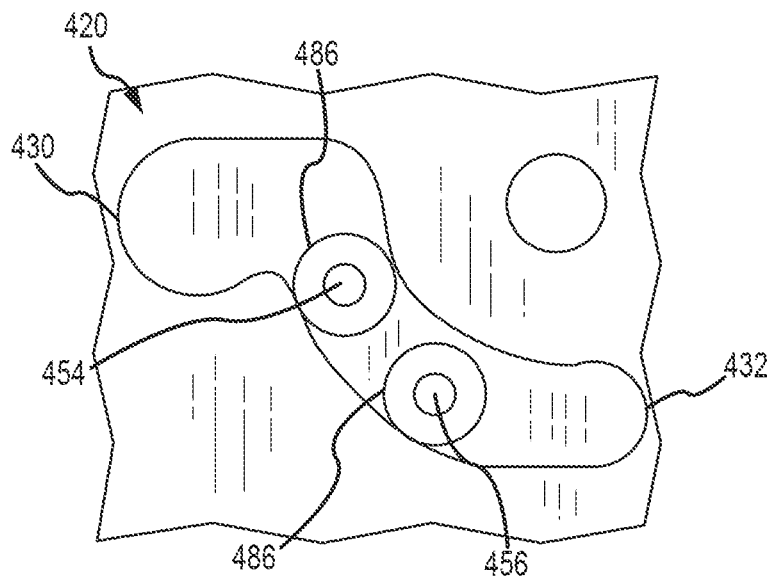
FIG. 9B is an enlarged side view that shows two representative positions of one outer pawl pivot in the slot for the FIG. 9A configuration, in accordance with various embodiments.

The entirety of the outer pawl 480 (including the pivots 486) may be moved downwardly in the vertical dimension 416c (as well as longitudinally in the longitudinal dimension 416a) by the pivots 486 moving along the third segment 422c of the lower sidewall 422 of the slot 420 and with the outer pawl 480 remaining in the erected position. This advances the pivots 486 (outer pawl 480) within the corresponding slot 420 from the first location/second pivot pin position 452 (e.g., FIG. 8B) at least generally in the direction of the second end 432 of the slot 420, all as shown in FIGS. 9A and 9B. The noted movement of the pivots 486 along the slot 420 (in the direction of the arrow B in FIG. 9A), decreases the elevation (in the vertical dimension 416c) of the restraining head 482 (i.e., decreases the spacing between the lower surface of the restraining head 482 and the conveyor plane 520) to bring the restraining head 482 into engagement with the retention base 512 (FIG. 9A). The initial engagement of the restraining head 482 with the retention base 512 may be when the pivots 486 are in the third pivot position 454 (FIG. 9B), and further advancement of the pivots 486 along the slot 420 in the direction of the second end 432 of the slot 420 in the direction of the arrow B in FIG. 9A (e.g., to dispose the pivots 486 at the fourth pin position 456 in FIG. 9B) will further decrease the elevation (in the vertical dimension 416c) of the retention base 512 relative to the conveyor plane 520. Note the reduction in the spacing between the lower surface of the retention base 512 and the conveyor plane 520 by comparison of FIG. 8A (first location/second pin position 452) and FIG. 9B (e.g., the fourth pin position 456). The outer pawl 480 also moves in the longitudinal dimension 416a in moving from the first location/second pin position 452 (e.g., FIG. 8B) to the fourth pin position 456 (e.g., FIG. 9B). That is, note the increase in the amount of the restraining head 482 of the outer pawl 480 that overlies the retention base 512 by a comparison of FIG. 8A with FIG. 9A.

Figure 10A:
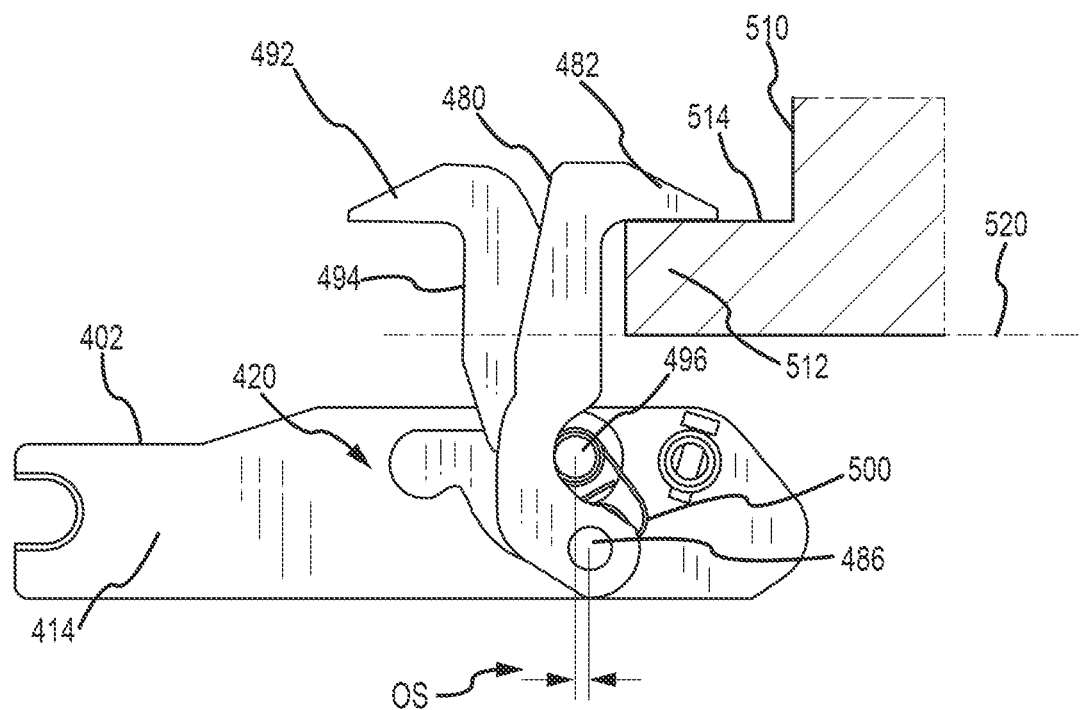
FIG. 10A is a cutaway, side view of the cargo restraint of FIGS. 4A-4D with the outer pawl and inner pawl each being in an erected position and with the restraining head of the outer pawl having moved the retention base of the ULD to the conveyor plane, in accordance with various embodiments.

The above-noted movement of the outer pawl 480 from the FIG. 8A/8B position to the FIG. 9A/9B position also moves the inner pawl 490 away from its retracted position (e.g., FIG. 6A) and in the direction of its erected position (e.g., FIG. 10A). This is a due to an interconnection between the outer pawl 480 and the inner pawl 490 by one or more torsion springs 500 (e.g., a separate torsion spring 500 may be mounted on each pivot 486 of the outer pawl 480). The movement of the inner pawl 490 relative to the sidewalls 402 of the cargo restraint 400 is by a pivotal motion about the pivot pin 496 in the direction of the arrow A shown in FIG. 9A.

Figure 10B:
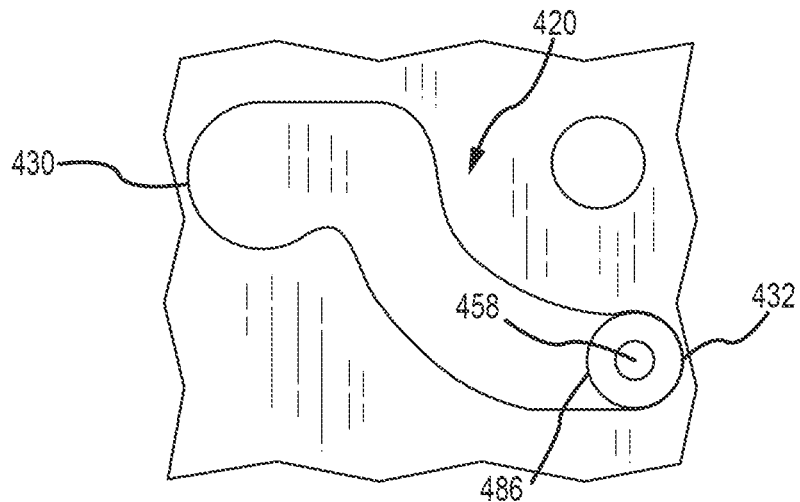
FIG. 10B is an enlarged side view that shows the position of one outer pawl pivot pin in the slot for the FIG. 10A configuration, in accordance with various embodiments.

The entirety of the outer pawl 480 may be further advanced at least in the longitudinal dimension 416a to move the pivots 486 (outer pawl 480) within the slot 420 from the fourth pivot pin position 456 (e.g., FIG. 9B) at least generally in the direction of the second end 432 of the slot 420 to dispose the pivots 486 at the second end 432 of the slot 420, all as shown in FIGS. 10A and 10B. This movement of the outer pawl 480 may include an initial portion of movement of the pivots 486 along a distal portion of third segment 422c of the lower sidewall 422 of the slot 420, which may further decrease the elevation (in the vertical dimension 416c) of the restraining head 482 (e.g., decreases the spacing between the lower surface of the restraining head 482 and the conveyor plane 520). In any case when the pivots 486 reach the fourth segment 422d of the lower sidewall 422 of the slot 420: 1) the lower surface of the retention base 512 may be disposed at or in closely-spaced relation to the conveyor plane 520 (FIG. 10A); and 2) the outer pawl 480 will thereafter primarily move in the longitudinal dimension 416a until reaching the fifth pin position 458 (e.g., FIG. 10B). Note the increase in the amount of the restraining head 482 of the outer pawl 480 that overlies the retention base 512 by a comparison of FIG. 9A with FIG. 10A. Also note that the above-noted movement of the outer pawl 480 relative to the sidewalls 402 of the cargo restraint 400 also disposes the inner pawl 490 in its fully erected position of FIG. 10A (via the above-noted spring(s) 500). The foregoing may be reversed to return the outer pawl 480 and the inner pawl 490 to their respective retractive positions of FIG. 6A (the spring(s) 500 may bias the inner pawl 490 to its retracted position.

Figure 11:
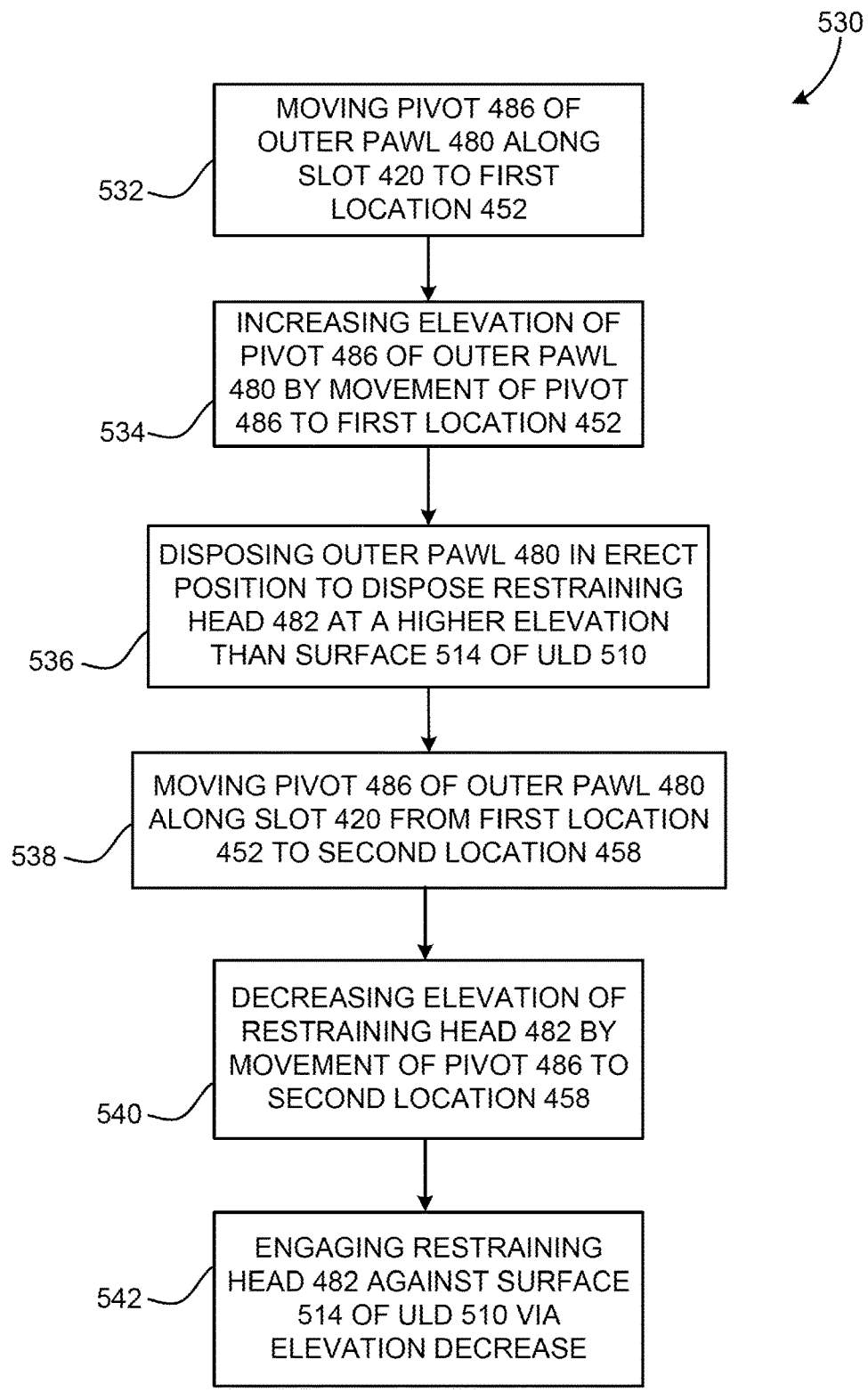
FIG. 11 is a method for restraining a structure with a cargo constraint, in accordance with various embodiments.

A method of using the cargo restraint 400 to restrain a ULD 510 in accordance with FIGS. 6A-10B is illustrated in FIG. 11 and is identified by reference numeral 530. The method 530 includes moving a pivot 486 of the outer pawl 480 (e.g., a first movement; a movement of the pivot 486 at a first time) along its corresponding slot 420 to the first location 452 (step 532). The elevation of the pivot 486 of the outer pawl 480 may be increased by this first movement of the pivot 486 to the first location 452 (step 534). The outer pawl 480 may be disposed in an erect position, and with the pivot 486 being at the first location 452 the restraining head 482 of the outer pawl 480 may be disposed at a higher elevation than the surface 514 of the ULD 510 (step 536). The pivot 486 of the outer pawl 480 may be moved (e.g., a second movement; a movement of the pivot 486 at a second time that is different than the first time of step 532) along the corresponding slot 420 from the first location 452 to the second location 458 and with the outer pawl being 480 in the erect position (step 538). This second movement of the pivot 486 may decrease the elevation of the restraining head 482 of the outer pawl 480 (step 540). Such a decrease of the elevation of the restraining head 482 of the outer pawl 480 may engage the restraining head 482 against the surface 514 of the ULD 510 (step 542).

There are a number of points of note illustrated by the above-described operation of the cargo restraint 400. One is that the pivots 486 of the outer pawl 480 are disposed on one side of the center of the pivot pin 496 (for the inner pawl 490, and that remains in fixed location in the longitudinal dimension 416a) prior to the cargo restraint 400 being disposed in its fully latched configuration of FIG. 10A (the "left side" of the center of the pivot pin 496 in the view shown in FIGS. 6A, 7A, 8A, and 9A). In the fully latched configuration of FIG. 10A, the center of the pivots 486 of the outer pawl 480 are now disposed on the opposite side of the center of the pivot pin 496 compared to the configurations of FIGS. 6A, 7A, 8A, and 9A (the center of the pivots 486 of the outer pawl 480 are disposed on the "right side" of the center of the pivot pin 496 in the fully latched configuration of FIG. 10A). This is represented by the offset "OS" shown in FIG. 10A and that assists with retaining the cargo restraint 400 in the fully latched configuration of FIG. 10A. The pivots 486 may also be at least somewhat "snap-locked" within the slot 420 at its second end 432 by the above-noted stopper 426 (that protrudes into the slot 420).

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cargo restraint comprising:
    a first wall comprising a first slot, wherein a first location of said first slot is disposed at a first elevation, wherein a second location of said first slot is disposed at a second elevation that is less than said first elevation, and wherein said first location and said second location are spaced along a length of said first slot and along a longitudinal dimension of said cargo restraint;
    a first pawl; and
    a first pivot disposed at a fixed location on said first pawl and movable along said length of said first slot, wherein said first pawl is pivotable relative to said first wall about said first pivot
    wherein said first slot comprises a first slot end and a slot second end,
    wherein said first slot comprises a first lower sidewall and a first upper sidewall that are spaced in at least one of a width dimension or a length dimension of said first slot and that each extend along said length of said first slot from said first slot end to said slot second end,
    wherein an elevation of said first lower sidewall increases proceeding along said length of said first slot from said first slot end to said first location,
    wherein said slot second end comprises said second location and is semicircular, and
    wherein said first upper sidewall initially extends downwardly proceeding from said slot second end and then at least generally upwardly to define a stopper that projects into an interior of said first slot.

2. The cargo restraint of claim 1, wherein said elevation of said first lower sidewall decreases proceeding along said length of said first slot from said first location in a direction of said second location.

3. The cargo restraint of claim 1, further comprising:
    a second pawl pivotally connected to said first wall at a second fixed location; and
    a first spring interconnecting between said first pawl and said second pawl so that advancing said first pivot along said length of said first slot proceeding from said first location in a direction of said second location changes said second pawl from a first position to a second position that is more erect than said first position.

4. The cargo restraint of claim 3, wherein said second fixed location is located between said first location and said second location in said longitudinal dimension of said cargo restraint.

5. The cargo restraint of claim 1, wherein said first pawl is pivotable relative to said first wall about a single axis, and wherein a position of said single axis is variable along said length of said first slot.

6. A cargo system comprising a first structure and the cargo restraint of claim 1, wherein said first structure comprises a first surface and said first pawl comprises a restraining head engageable with said first surface.

7. The cargo system of claim 6, further comprising:
a first configuration comprising said first pawl being erect, said first pivot being at said first location, and said restraining head being at a higher elevation than said first surface.

8. The cargo system of claim 7, further comprising:
an intermediate configuration spaced from said first location in a direction of said second location within said longitudinal dimension, wherein said intermediate configuration comprises said restraining head being in overlying and spaced relation to said first surface.

9. The cargo system of claim 8, further comprising:
a second configuration comprising said first pawl being erect, said first pivot being at said second location, and said restraining head engaging said first surface.

10. A method of restraining a first structure with a cargo restraint comprising a first slot and a first pawl, wherein said first pawl comprises a first pivot disposed at a fixed location on said first pawl and disposed within said first slot, said method comprising:
moving said first pivot at a first time along said first slot to a first location;
increasing an elevation of said first pivot in response to said moving said first pivot at said first time;
disposing said first pawl in an erect position, wherein said first pawl being in said erect position with said first pivot being at said first location disposes a restraining head of said first pawl at a higher elevation than a first surface of said first structure;
moving said first pivot at a second time along said first slot from said first location to a second location and with said first pawl being in said erect position, said first time being different from said second time;
decreasing said elevation of said restraining head in response to said moving said first pivot at said second time; and
engaging said restraining head against said first surface of said first structure during the step of decreasing said elevation of said restraining head.

11. The method of claim 10, further comprising:
changing said first pawl from a first orientation to a second orientation prior to said moving said first pivot at said first time, wherein said second orientation comprises said first pawl being more erect than said first orientation.

12. The method of claim 11, wherein said first orientation comprises said first pawl being at least generally horizontally disposed.

13. The method of claim 11, wherein said disposing comprises said changing and wherein said disposing is executed before said moving said first pivot at said first time.

14. The method of claim 10, further comprising:
providing a single pivot axis for said first pawl, wherein said first pivot comprises said single pivot axis, and wherein each of said moving said first pivot at said first time and said moving said first pivot at said second time comprise changing a location of said single pivot axis along said first slot.

15. The method of claim 10, wherein said cargo restraint further comprises a second pawl, said method further comprising:
changing said second pawl from a third orientation to a fourth orientation, wherein said fourth orientation comprises said second pawl being more erect than said third orientation.

16. The method of claim 15, wherein said third orientation comprises said first pawl being at least generally horizontally disposed.

17. The method of claim 15, wherein said changing said second pawl is in response to said moving said first pivot at said second time.

18. The method of claim 10, wherein said cargo restraint further comprises a second pawl, wherein said moving said first pivot at said second time comprises lifting said second pawl into a latching configuration.

* * * * *